United States Patent [19]

Glabe et al.

[11] 4,299,854

[45] Nov. 10, 1981

[54] GRAIN PROCESSING TO INHIBIT MOLD GROWTH

[75] Inventors: Elmer F. Glabe, Northbrook; Perry W. Anderson, Niles; Stergios Laftsidis, Chicago, all of Ill.

[73] Assignee: Food Technology Products, Chicago, Ill.

[21] Appl. No.: 164,826

[22] Filed: Jun. 30, 1980

Related U.S. Application Data

[63] Continuation of Ser. No. 884,756, Mar. 9, 1978, abandoned, which is a continuation-in-part of Ser. No. 676,247, Apr. 12, 1976, abandoned, which is a continuation of Ser. No. 484,461, Jul. 1, 1974, abandoned, which is a continuation of Ser. No. 350,346, Apr. 12, 1973, abandoned, which is a continuation-in-part of Ser. No. 158,616, Jun. 30, 1971, abandoned.

[51] Int. Cl.$^3$ ............................................... A23L 9/00
[52] U.S. Cl. .................................... 426/331; 426/335; 426/623
[58] Field of Search ................ 426/93, 321, 331, 335, 426/654, 623, 635, 295, 807, 2, 618; 424/315, 317

[56] References Cited

U.S. PATENT DOCUMENTS

| 2,475,368 | 7/1949 | Bauer | 560/607 |
|---|---|---|---|
| 2,546,568 | 3/1951 | Taylor | 426/335 |
| 2,567,631 | 9/1951 | Anderson | 426/331 |

FOREIGN PATENT DOCUMENTS

| 85073 | 6/1958 | Denmark . | |
|---|---|---|---|
| 2061672 | 6/1972 | Fed. Rep. of Germany | 426/335 |

*Primary Examiner*—Hiram Bernstein
*Attorney, Agent, or Firm*—Richard L. Johnston

[57] ABSTRACT

The invention provides a process for inhibiting mold growth in a cereal grain having a seed coat by contacting such grain with sodium diacetate in such amounts and under such conditions that the sodium diacetate penetrates the seed coat and inhibits the growth of mold in said grain. The invention is especially useful in the treatment of high moisture corn.

9 Claims, No Drawings

GRAIN PROCESSING TO INHIBIT MOLD GROWTH

RELATED APPLICATIONS

This is a continuation, of application Ser. No. 884,756, filed Mar. 9, 1978, now abandoned, which is a continuation-in-part of United States application Ser. No. 676,247 filed Apr. 12, 1976, now abandoned which is a continuation of United States application Ser. No. 484,461 filed July 1, 1974, now abandoned; which is a continuation of United States application Ser. No. 350,346 filed Apr. 12, 1973, now abandoned; which is a continuation-in-part of U.S. application 158,616 filed June 30, 1971, now abandoned.

BACKGROUND

Food and feed grains have long been the victims of the ravages of mold and other microorganisms. The quantity of grain which is destroyed through the actions of mold in the United States alone reaches well into the many millions of bushels. It has been estimated that fifteen to twenty percent of the corn crop alone is rendered useless for food and feed purposes due to the growth of various molds thereon during the storage of the corn. The problem is even greater if one considers the destruction of food grains on a worldwide basis.

The corn crop alone in the United States reaches well over several billion bushels annually. As much as eighty percent of this corn is consumed in animal feeding operations, specifically beef and dairy cattle, swine and fowl, after having been ground into finer mesh particles and mixed with other feed supplements. Perhaps the greatest single use for corn is that of feeding and fattening beef cattle. The common practice is to raise the latter on the grass ranges of the intermountain states. They are then moved toward the Midwest and East on their way to eventual slaughter and market as beef. The last step in this process is a feeding operation during which the beef cattle are fed enormous quantities of corn. This has the dual purpose of increasing weight as well as markedly improving the texture of the resulting beef. Obviously, this "feed lot" operation is based strictly on economics. The weight gain per pound of feed is the important factor.

When corn is harvested and removed from the cob, it commonly has an average moisture content coming from the field of 25.0 to 26.0% by weight, with a range from 20.0 to 29.0% by weight. In some seasons the moisture content of the whole kernels as they come from the field may be as high as 35% by weight. At these high moisture levels, corn has an excellent feed efficiency or weight gain per pound. If, however, the corn is dried to 10.0 or 12.0% moisture, the weight gain per pound or feed efficiency is markedly less. Some researchers have found it to be as much as 35% less in efficiency. If such predried corn is moistened with water to return it to say 20.0 to 29.0% moisture content and if it is then fed to beef cattle, the efficiency or weight gain per pound is not brought back to that of the undried or natural field-level moisture content corn. The reason for this is not understood, but the effect is a matter of record.

Field corn brought into the farm headquarters and kept on hand for feeding purposes, despite some drying in the field, usually has a natural moisture content of at least 20% by weight and is readily attacked by mold. In fact, in order to prevent mold from growing during storage of the corn, the moisture content must be reduced to 12.0%. Corn having a moisture content above this level supports mold growth which then grows increasingly profusely as the moisture content of the corn is increased above 12.0%. Thus, corn having a 20.0% moisture content will grow mold much more rapidly and easily than corn at 14.0% moisture.

The mold grows any place on the surface of the corn kernel. It has its greatest hold in the cracks or interstices at the germ end of the kernel. This makes it particularly difficult to inhibit, since growth can easily get started in these folds in the seed coat. Any inhibitor which is used must, therefore, penetrate into these folds.

Corn is normally stored on the farm headquarters area only after the corn has been artificially dried to reduce the moisture content to below 12.0%. This is done on the farm by means of a grain dryer installed at the farm headquarters; alternatively, the corn can be transported to a drying operation generally in a neighboring town and then brought back to the farm for storage before use during the forthcoming winter, spring and summer seasons. Obviously, this entails a considerable expense for drying and for transportation. Recently, there has also been a shortage of fuel for artificial drying.

The farmer or feed lot operator has one alternative and that is to store the corn in a large silo or enclosed tank. During such storage, yeast growth is encouraged. This rapidly uses up the available oxygen thereby preventing mold from growing. The installation of such a special silo or tank is a very expensive operation, and an expense which small farm operators hesitate to pay.

Molds growing on corn are generally the common penicillium and rhizopus varieties, although many others are also commonly found. Some molds produce significant quantities of mycotoxins. These are particularly virulent for fowl, since they show a high degree of mortality if fed on feeds made from corn which has become moldy during storage. The literature indicates also that such mycotoxins do produce effects in cattle and swine as well, particularly in the former. The result is a much reduced weight gain and frequently illness during the growing period from calf on up. Mycotoxins are also known to be highly dangerous to human beings, having produced a high percentage of illness with some indications of deaths being directly related to ingestion of larger doses of such mycotoxins obtained from using moldy grain.

The corn which is not used in animal feeding operations is consumed in processing operations. The oil is extracted during a wet milling operation, followed by separation of zein or protein from the starch. The latter is then used for making corn sugar or glycose, as well as a wide variety of dextrins. The latter and large quantities of corn starch are used industrially and in food products as well. Corn that has become moldy is virtually unusable for refining or separation into starch, protein and oil fractions.

It is evident, therefore, that the control of mold, that is, the prevention of mold growth on corn, is of utmost importance from a health standpoint as well as plain economics. For the farmer, this means being able to store the corn on his premises preferably at the natural moisture content at which he brings it from the field during harvesting and without artificial drying. If he is able to provide such storage, the cost of drying and other related costs such as transportation are thereby avoided. Of even greater importance is the feed value or weight gain per pound of the undried corn.

The foregoing discussion is directed primarily to corn but the problem also exists with respect to wheat, rice, oats, barley, rye, milo, red millet, white millet, yellow millet, and other cereal grains having a seed coat.

Recent publications indicate that attempts have been made to solve this problem with respect to corn by using propionic acid and/or acetic acid as mold inhibitors. Tests reported in an article in Feedstuffs for Mar. 5, 1971, show that corn which had been treated with a mixture of propionic acid and acetic acid and fed to dairy cattle resulted in reduced feed intake and milk fat depression and therefore left much to be desired.

OBJECTS

One of the objects of the present invention is to provide a new and improved process of inhibiting mold in a cereal grain having a seed coat and containing its natural moisture content without artificial drying, and particularly high moisture corn.

A further object is to provide a process of the type described using a mold inhibitor which penetrates the seed coat.

Still a further object is to provide a process of the type described which when applied to feed grains such as corn results in a product more palatable to animals and which increases feed intake and feed efficiency.

Another object is to provide a process of feeding animals wherein a cereal grain having a seed coat is harvested, the whole kernels are treated, while they still contain their natural moisture without artificial drying, with a normally solid material which penetrates the seed coat and inhibits the growth of mold, and said grain is stored pending use as an animal feed without artificial drying.

Another object is to provide a process of the type described which will reduce grain spoilage and decrease farm costs.

Still a further object is to provide a process of the type described which is applicable to the treatment of grain that is further processed and used for human consumption. Other objects will appear hereinafter.

BRIEF SUMMARY OF THE INVENTION

In accordance with the invention, mold growth on cereal grains having a seed coat is inhibited by contacting such grains which have not been artificially dried and contain their natural moisture with sodium diacetate in such amounts and under such conditions that the sodium diacetate penetrates the seed coat and inhibits growth of mold in said grains.

While the invention is described with respect to the use of sodium diacetate, the potassium, calcium and other edible, complex salts which contain combined but undissociated acetic acid and which are substantially equivalent can be substituted in whole or in part.

DETAILED DESCRIPTION OF THE INVENTION

The invention is applicable to all food and feed grains. The data reported herein are confined to corn or maize used for animal feeding purposes specifically. The scope of the invention should be considered to be for not only corn but wheat, rice, oats, barley, rye, milo, red millet, white millet, yellow millet, and other cereal grains having a seed coat.

It has been found that sodium diacetate, if properly applied to the surface of corn, does bring about the desired inhibiting activity. The mechanism whereby this is brought about is not totally clear; however, there appears to be a slow penetration of the corn by the sodium diacetate compound. The evidence for this is the gradual disappearance of the sodium diacetate from the surface of the corn, even though the latter is kept in sealed glass jars. Some of our data indicate that this penetration is followed by a possible reaction with the corn itself which thereby renders the corn far less susceptible to attack by mold.

It has been discovered that approximately 0.5 to 0.8% of sodium diacetate applied uniformly to the surface of whole corn kernels at 21.0 to 23.0% moisture content renders these corn kernels impervious to mold growth when stored under typical farm storage conditions. Smaller quantities of sodium diacetate provide protection for shorter periods of time. As indicated above, there is a relationship between mold growth and moisture content in corn. Similarly, there is a relationship between the amount of sodium diacetate necessary for inhibition of mold and the moisture content of the corn. Lower moisture content corn, for example, 16.0 or 17.0% moisture, would require less inhibitor than corn having a moisture content of 21.0%. At a high moisture content of 29.5% the percentage of sodium diacetate should be increased to 1.25% by weight of the corn. With corn kernels containing 32% by weight moisture, about 1.5% by weight sodium diacetate should be added. In some cases it may be desirable to apply the treatment in stages, e.g., 0.75%–1.0% in the fall followed by a second treatment of about 0.75% in the spring. In general, for long term storage the amount of sodium diacetate should be increased about 0.06% for each 1% increase in moisture from a minimum of 0.8% at 22% moisture to 1.5% at 32% moisture. At moisture contents below 22% and above 32% the amount of sodium diacetate can be correspondingly decreased and increased, as the case may be, but the minimum amount will not usually be less than 0.4% and the maximum amount will not usually exceed 2%.

Of great significance is the thoroughness of distribution of the sodium diacetate on the surface of the corn. It is highly important that such distribution assure that the inhibitor find its way to the cracks and crevises at the germ end of the corn kernel. If this is done properly, the corn will be kept mold-free for months of storage on the farm.

It should be understood that corn harvested in the fall and kept on the farm will generally not be very susceptible to mold growth during the months of November through March, assuming that the atmospheric temperature is typical of that for the Midwestern part of the United States where the temperatures are in the neighborhood of the freezing mark. Molds do not grow at these lower temperatures. As spring advances into summer, temperatures rise rapidly and if the corn is still very moist, mold growth begins and proceeds rapidly thereafter. Since a farmer must provide corn for feed until the next crop arrives, the critical storage period then is from March through September of any given crop year.

Sodium diacetate, recognized as a definite chemical compound providing diacetate ion, can be thoroughly distributed over the surface of the corn as a dry powder. Although this method is preferred, it should be understood that solutions of sodium diacetate may be sprayed on the corn or the corn may be dipped in such sodium diacetate solutions. The latter two methods have the disadvantage of adding moisture to the corn, whereas dry application does not change the moisture content at all.

In performing the dry application method, the corn is conducted through an apparatus or conveyor which is so constructed as to move the corn from one bin to a second bin. During such transfer and at one place in the conveyor, the action is fast enough to raise the corn into the atmosphere above the conveyor blades. At this point, very finely divided sodium diacetate is admitted to this area of the conveyor. Since the corn is "in the air," so to speak, and since the sodium diacetate is also occupying the air space, the corn thereby picks up a uniform coating of the chemical. Time during conveying is obviously important.

In the examples reported below, this method was used in applying the sodium diacetate to the surface of the corn as the "dry operation".

For liquid operations, we have made use of a common liquid spraying device. In this instance, the spray was applied to the corn as it was moving through a horizontal-flight conveyor from one bin to a second bin.

The invention will be ilustrated but is not limited by the following examples in which the quantities are by weight unless otherwise indicated.

EXAMPLE I

Field corn brought in from the harvest was used in the tests reported in this example. In each case, 300 pounds of corn was mixed with sodium diacetate in the manner previously described. The moisture of the corn was then determined. Samples of each of the test products were then placed in closed glass jars and removed to the laboratory.

The jars were then placed in a cabinet in which the temperature changed over a period of twenty-four hours simulating night and day conditions of farm storage. For 16 hours, the samples were at a temperature of 85° F. and then for the remaining 8 hours they were at a temperature of 65° F. These are for the samples marked "(a)".

Some of the corn was also held on the farm under typical storage conditions. These tests were started in November and the corn was held under typical conditions during the winter and through the spring of the following year.

The results are shown in the following table:

TABLE I

| Test Number | Percent Sodium Diacetate Based on Weight of Corn | Mold Free (Days) | Percent Moisture in the Corn |
|---|---|---|---|
| 1[a] | 0.0 | 3 | 21.4 |
| 2[a] | 0.19 (D) | 3 | 20.5 |
| 3[a] | 0.43 (D) | 12 | 19.9 |
| 4[a] | 0.54 (S) | 7 | 21.7 |
| 5[a] | 0.70 (D) | 60+[c] | 21.3 |
| 6[a] | 0.80 (D) | 60+[c] | 21.6 |
| 7[b] | 0.80 (D) | 205+[c] | 21.7 |
| 8[b] | 0.0 | 90 | 21.7 |

[a] Storage in glass jars in laboratory cycling from 16 hours at 85° F. to 8 hours at 65° F. per 24 hours.
[b] Storage in farm warehouse, on floor, exposed to air, from November to June. Ambient temperatures 20° F. to 82° F.
[c] Storage discontinued.

As shown in Table I the amounts of sodium diacetate used ranged from 0.19% to 0.80%. In Table I the tests marked "(D)", the sodium diacetate was applied in dry form. In test number 4 marked "(S)", the sodium diacetate was applied in water solution.

The data shown in Table I indicate that quantities of 0.70% of sodium diacetate and higher control mold growth on the corn under the most ideal conditions for periods of time equivalent to twenty times the time period required to develop mold on untreated corn held under the same conditions (see test number 5 versus number 1).

Similarly, the data show that as little as 0.43% sodium diacetate on moist field corn will preserve that corn under the most ideal conditions for mold growth for a period of time equivalent to four times that required to develop mold in untreated corn (see test number 3 versus number 1).

The data also show that 0.8% sodium diacetate applied to field corn stored under farm conditions kept the corn free from mold for a minimum of 205 days, at which time the corn was used for feeding purposes. In comparison, untreated corn held under the same conditions and at the same moisture content showed mold development in 90 days.

EXAMPLE II

In this series of tests, moist field corn from a field crop was treated with several different levels of sodium diacetate. In each case, the chemical was applied in dry form in a laboratory mixer simulating the conditions indicated above for application of them chemical at the farm. A sample of each was then treated as follows.

The corn kernels were washed with distilled water in an attempt to recover the sodium diacetate which had been applied to the surface. The wash water was transferred to a beaker and the washing procedure repeated two more times, after which all of the washings were combined. The washings were then titrated with 0.1/N sodium hydroxide to a color end-point using a pH meter and phenolphthalein as an indicator.

Washings were made on corn immediately after application of the sodium diacetate and on further lots after 48 hours of storage in glass jars at room temperature, and again on lots kept for 120 hours at storage at room temperature in closed glass jars.

The results are shown in Tables II, III and IV.

TABLE II

| | | Acidity of Washings from 25g Corn Kernels[1] as cc of 0.1/N Sodium Hydroxide[2] After: | | |
|---|---|---|---|---|
| Test Number | Treatment: Corn Kernels Plus Sodium | Immediately Upon Application (A) | 48 hours Storage at Room Temperature (B) | 120 hours Storage at Room Temperature (C) |
| 1 | None | 0.7cc | 0.7cc | 0.7cc |
| 2 | 0.25% 8.2 | 1.0 | 0.6 | |
| 3 | 0.50 | 18.3 | 2.4 | 2.5 |
| 4 | 0.80 | 26.1 | 4.5 | 4.3 |

[1] Field Corn Crop; 22.3% moisture as received.
[2] Titrated to neutrality against phenolphthalein with electric pH meter.

TABLE III

| | Acidity Expressed as cc 0.1/N Sodium Hydroxide[1] | |
|---|---|---|
| Test Number | Quantity of Sodium Diacetate as Percent Based on Moist Field Corn | cc 0.1/N Sodium Hydroxide Required to Neutralize[1] (A) |
| 1 | None | 0.0 cc |
| 2 | 0.25 | 9.1 |

TABLE III-continued

| | Acidity Expressed as cc 0.1/N Sodium Hydroxide[1] | |
|---|---|---|
| Test Number | Quantity of Sodium Diacetate as Percent Based on Moist Field Corn | cc 0.1/N Sodium Hydroxide Required to Neutralize[1] (A) |
| 3 | 0.50 | 18.3 |
| 4 | 0.80 | 29.3 |

[1]Titrated to neutrality against phenolphthalein with pH meter.

TABLE IV

| | | Acidity[2] of 25 Grams of Ground Corn Kernels[1] after Washing (Table II), Drying and Grinding | | |
|---|---|---|---|---|
| Test Number | Treatment: Corn Kernels plus Sodium Diacetate | Immediately on Application of Sodium Diacetate to Corn Kernels | Corn Kernels Stored 48 Hours After Treatment Before Grinding and Titration | Corn Kernel Stored 120 Hours After Treatment Before Grinding and Titration |
| 1 | None | 20.2 cc | 20.2 cc | 20.2 cc |
| 2 | 0.25% | 20.7 | 22.5 | 25.0 |
| 3 | 0.50 | 20.0 | 34.7 | 39.5 |
| 4 | 0.80 | 21.7 | 40.0 | 44.0 |

[1]22.3% moisture as received from field.
[2]Titrated to neutrality against phenolphthalein with pH meter.

Table III shows the quantities of 0.1/N sodium hydroxide required to neutralize quantities of sodium diacetate which were used in treating the corn. The relationship between Table II and III is that if the sodium diacetate applied to the surface of the corn is merely resting thereon without any reaction, then the washing procedure should be able to remove it. The titration results should then indicate the degree of recovery. Column (A) on Table II should be compared to column (A) of Table III. It will be noted that in tests 2 through 4, the recovery of the sodium diacetate from the corn kernels by the washing procedure is very good. In the case of test 3, it is one hundred percent recovery. In the case of test 5 and test 3, both of which show slightly higher values for the sodium diacetate alone, the experimental error thus indicated is well within reasonable limits.

Columns (B) and (C) of Table II show the very interesting finding that recovery of sodium diacetate after the corn kernels have been allowed to stand for 48 hours, and again for 120 hours, is far from the theoretical amount and also far beyond the posibility of being within the range of experimental error.

It should be noted that in test 3, 18.3 cc of 0.1/N sodium hydroxide were used on the washings from the corn immediately after application of the chemical to the corn. After 120 hours of storage of the corn, however, fully 80% of the sodium diacetate had disappeared from the surface of the corn. The same is true for test 4.

In Table IV, data are given indicating that the sodium diacetate does indeed penetrate into the corn kernel. It can be found inside the kernel. The method used was as follows.

The corn kernels which were washed and used in arriving at the date of Table II were carefully dried. They were then ground to a particle size of approximately 40 mesh. This ground cornmeal was then extracted with distilled water and the extract was then titrated to a phenolphthalein end-point using a pH meter. The data show very interesting correlations with those found on Table II. In those tests where recovery of the sodium diacetate from the outside of the corn kernel was low, finding of the sodium diacetate inside the kernel, that is, in the endosperm itself, was high.

Referring to test 4 in Tables II and IV, it will be noted that after 120 hours, the 0.1/N sodium hydroxide equivalent of the sodium diacetate on the outside of the kernel was only 4.3 cc, in contrast to 26.1 cc immediately after the sodium diacetate was applied to the surface of the corn kernel. The corn endosperm, however, showed 44.0 cc equivalent in the endosperm after 120 hours in contrast to 21.7 cc in the endosperm immediately after application of 0.8% sodium diacetate on the surface of the corn. By way of further contrast, untreated corn endosperm from kernels similarly washed but not having been treated with sodium hydroxide, showed 20.2 cc both initially and after 120 hours of storage.

Tests 2 and 3 on Tables II and IV show analogous results but in different amounts, depending upon the quantity of sodium diacetate used.

The correlation between the storage data shown in Table I and the apparent penetration of the corn kernel by sodium diacetate as shown in Tables II, III and IV is conclusive evidence that the sodium diacetate is a unique compound which reacts in a singular manner to penetrate the corn surface an to react with the endosperm, thereby making the entire corn kernel an inhospitable area for mold growth.

With this knowledge, it is possible to control mold on corn by varying the quantity of sodium diacetate with the degree of moisture content in the corn and the length of time the corn is to be stored under moist conditions.

EXAMPLE III

Whole kernel corn having an initial natural moisture content of 29.5% as it came from the field without artificial drying was divided into five equal portions and four portions were mixed with different amounts of sodium diacetate, namely, 0.25%, 0.50%, 1.00% and 1.25%, both micronized and unmicronized, the fifth portion, which was untreated, being a control.

Two types of tests were made, one in open pails and another in closed bags, at room temperatures around 70°–75° F. After five weeks of storage at room temperatures it was observed that mold was effectively inhibited at a level of 1.25% in both types of tests. The micronized sodium diacetate was effective at a 1.00% level which may have been due to better distribution. In all other cases, including the controls, mold developed in one to two weeks.

In these tests, mold developed in the controls while the moisture content dropped in the corn in open pails from 29.5% to 16.1% over a three week period and rose in the closed bags to 35.2%. In tests at a level of 0.5% sodium diacetate the moisture content after three weeks dropped to 15.7% in the open pails and rose to 39.5% in the closed bags. At a level of 1% sodium diacetate the moisture content after three weeks dropped to 22.9% in the open pails and rose to 40.4% in the closed bags. At a level of 1.25% sodium diacetate the moisture content after five weeks dropped to 10.8% after rising to 39.6% by the end of the second week in open pails and in closed bags the moisture content rose to 40.4% in a week and remained at this level.

This example demonstrates that the amount of sodium diacetate, to be effective in controlling mold on whole corn kernels containing their natural moisture, varies with the initial moisture content at the time of treatment and that the treatment is effective regardless of whether the moisture content rises or falls thereafter.

EXAMPLE IV

Samples of the corn treated in test 4 of Tables II, III and IV were fed to beef cattle and to swine in comparison with untreated corn. Observations were carefully made. It was very obvious that both types of animals preferred the corn treated with sodium diacetate to the untreated corn. When given a free choice of selection by being confronted with quantities of treated and untreated corn on the floor of the feeding pen, the animals chose the treated corn and consumed it first before going to the untreated grain. Thus, the invention improved the palatability of the cereal grain.

From the foregoing test results, it is evident that the invention not only affords inhibition of mold by a mold inhibitor which penetrates the seed coat of the grain but also improves palatability or taste thereby increasing feed intake by animals while at the same time making it possible for the farmer to reduce his costs and providing products that are also useful for human consumption.

The invention is hereby claimed as follows:

1. A process for inhibiting mold growth in kernels of a cereal grain having a seed coat which consists essentially of contacting said kernels in the presence of the natural moisture contained therein without artificial drying with sodium diacetate uniformly distributed on the surface of said kernels at ambient temperatures and allowing the said kernels of cereal grain to remain in contact with said sodium diacetate until the sodium diacetate penetrates the seed coat, the amount of sodium diacetate being sufficient to inhibit mold growth in said cereal grain, and storing said cereal grain so treated without artificial drying, thereby preserving the natural moisture.

2. Cereal grain inhibited against mold growth consisting essentially of whole kernels of cereal grain having a seed coat and containing their natural moisture therein without artificial drying, said seed coat being uniformly surface coated with sodium diacetate which has penetrated through the seed coat into the endosperm, the amount of said sodium diacetate being sufficient to inhibit mold growth in said cereal grain.

3. A process for inhibiting mold growth in a cereal grain as claimed in claim 1 in which the grain is corn, and which consists essentially in harvesting said corn, adding sodium diacetate to whole kernels of the harvested corn while they still contain their natural moisture as harvested without artificial drying, said sodium diacetate being uniformly distributed on the surface of said corn and allowed to remain in contact therewith at ambient temperatures until it penetrates the seed coat into the endosperm, the amount of sodium diacetate being sufficient to inhibit mold growth in said corn, and storing said corn so treated without artificial drying.

4. Cereal grain as claimed in claim 2, in which the grain is corn, and the amount of sodium diacetate is within the range of 0.4 to 2.0% by weight of said corn.

5. A process for inhibiting mold growth in cereal grain as claimed in claim 1 in which said grain is corn containing 20% to 35% moisture and the amount of sodium diacetate added is within the range of 0.4% to 2.0%.

6. A process for inhibiting mold growth in a cereal grain as claimed in claim 1 in which the cereal grain is corn having a moisture content from approximately 22% to 32% and the amount of sodium diacetate applied is within the range of 0.8% to 1.5%, the amount increasing by approximately 0.06% for every 1% increase in moisture.

7. A process for inhibiting mold growth in a cereal grain as claimed in claim 1 in which the sodium diacetate is dry blended with the grain.

8. A process for inhibiting mold growth in a cereal grain as claimed in claim 1 in which the sodium diacetate is applied to said grain by passing said grain through an atmosphere containing sodium diacetate without adding free moisture.

9. Cereal grain as claimed in claim 2 in which the grain is corn.

* * * * *

UNITED STATES PATENT AND TRADEMARK OFFICE
CERTIFICATE OF CORRECTION

PATENT NO. : 4,299,854
DATED : November 10, 1981
INVENTOR(S) : ELMER F. GLABE, PERRY W. ANDERSON and STERGIOS LAFTSIDIS It is certified that error appears in the above-identified patent and that said Letters Patent are hereby corrected as shown below:

Column 5, line 25, change "ilustrated" to --illustrated--.

Column 6, Table II, in the heading of column two, after "Sodium" insert --Diacetate--.

Column 6, Table II, Test Number 2, Cancel "8.2" in column 2; cancel "1.0" in column 3; cancel "0.6" in column 4; and insert --8.2-- under column 3; insert --1.0-- under column 4; and insert --0.6-- under column 5.

Column 7, line 48, change "posibility" to --possibility--.

Column 8, line line 25, after "surface" change "an" to --and--.

Signed and Sealed this

Ninth Day of February 1982

[SEAL]

Attest:

Attesting Officer

GERALD J. MOSSINGHOFF
Commissioner of Patents and Trademarks